United States Patent [19]
Blöchle et al.

[11] Patent Number: 5,146,682
[45] Date of Patent: Sep. 15, 1992

[54] HAND-HELD CIRCULAR SAW

[75] Inventors: Hans Blöchle; Rainer Schilling, both of Stuttgart; Martin Kummer, Filderstadt; Eduard Gansel, Dettenhausen; Heribert Schramm, Stuttgart; Helmut Eblen, Stuttgart; Joachim Müller, Stuttgart, all of Fed. Rep. of Germany

[73] Assignee: Robert Bosch GmbH, Stuttgart, Fed. Rep. of Germany

[21] Appl. No.: 687,920

[22] PCT Filed: Nov. 29, 1989

[86] PCT No.: PCT/DE89/00742
§ 371 Date: May 31, 1991
§ 102(e) Date: May 31, 1991

[87] PCT Pub. No.: WO90/06832
PCT Pub. Date: Jun. 28, 1990

[30] Foreign Application Priority Data

Dec. 22, 1988 [DE] Fed. Rep. of Germany ....... 3843236

[51] Int. Cl.⁵ .............................................. B23D 47/00
[52] U.S. Cl. ......................................... 30/124; 30/390
[58] Field of Search ................... 30/124, 388, 390, 391

[56] References Cited

U.S. PATENT DOCUMENTS 4,414,743 11/1983 Pioch et al. ............................ 30/124
4,675,999 6/1987 Ito et al. ................................ 30/124

Primary Examiner—Douglas D. Watts
Attorney, Agent, or Firm—Michael J. Striker

[57] ABSTRACT

A hand-held circular saw is designed so that a fan exhaust air from a fan wheel is introduced into a sawdust duct along the shortest path in a duct arranged inside a gearing housing, in order to reinforce a conveying of saw dust in the sawdust duct. The fan air is fed parallel to the movement direction of the sawdust, effects a vacuum in the sawdust duct and prevents stoppage of the duct.

15 Claims, 3 Drawing Sheets

HAND-HELD CIRCULAR SAW

BACKGROUND OF THE INVENTION

The present invention relates to a hand-held circular saw. A circular saw is already known from DE 35 25 092 A1 in which the sawdust is collected in the protective housing of the saw blade and conveyed to an outlet opening. Air is guided into the protective housing from the cooling fan via a hose in order to reinforce the removal of sawdust. This construction is quite expensive because of the necessary additional connection pieces and the separate hose. A considerable pressure loss occurs during the repeated deflection of the flow direction in the hose. Moreover the hose can be a hindrance when working.

SUMMARY OF THE INVENTION

Accordingly, it is an object of the present invention to provide a hand-held circular saw which has advantages over the existing hand-held circular saws.

In keeping with these objects, in a hand-held circular saw comprising a housing, a supporting table, and a saw blade driven by a motor and enclosed by a protective housing, an opening for supplying a fan air is connected with a duct which extends in a gearing housing of the circular saw and is connected with an exhaust side of a fan wheel.

The the hand-held circular saw, according to the invention has the advantage that the efficiency of the sawdust removal is improved with the simplest means and without additional structural components and the manufacture and assembly of the saw is simplified. This is achieved in that the fan exhaust air is guided directly into the sawdust duct along the shortest path inside the gearing housing. The fan air ducts are constructed in such a way that no additional parts are required. The outer dimensioning of the saw is not changed, so that handiness is in no way impaired.

In accordance with another feature of the present invention, the hand-held circular saw has a swinging protective hood which overlaps a portion of the saw blade projecting out over the supporting table and is swivelable into the protective housing when sawing, wherein the swinging protective hood forms a defining wall of the duct. It is particularly advantageous to use the swinging protective hood or the saw blade itself as a defining wall for the fan duct. This makes it possible to construct the duct in a very simple manner by means of casting without the need for additional cores or slides or the need to join additional parts during assembly. The sawdust removal is also improved in that a special duct is formed for it in which the sawdust is moved along a defined path. The introduction of the fan exhaust air into the sawdust duct parallel to the flow direction makes optimal use of its energy. The arrangement of the fan air inlet opening acts against possible stoppage in the sawdust duct.

BRIEF DESCRIPTION OF THE DRAWING

Two embodiment examples of the invention are shown in the drawing and explained in more detail in the following description.

DESCRIPTION OF THE EMBODIMENT EXAMPLES

Figure 1:
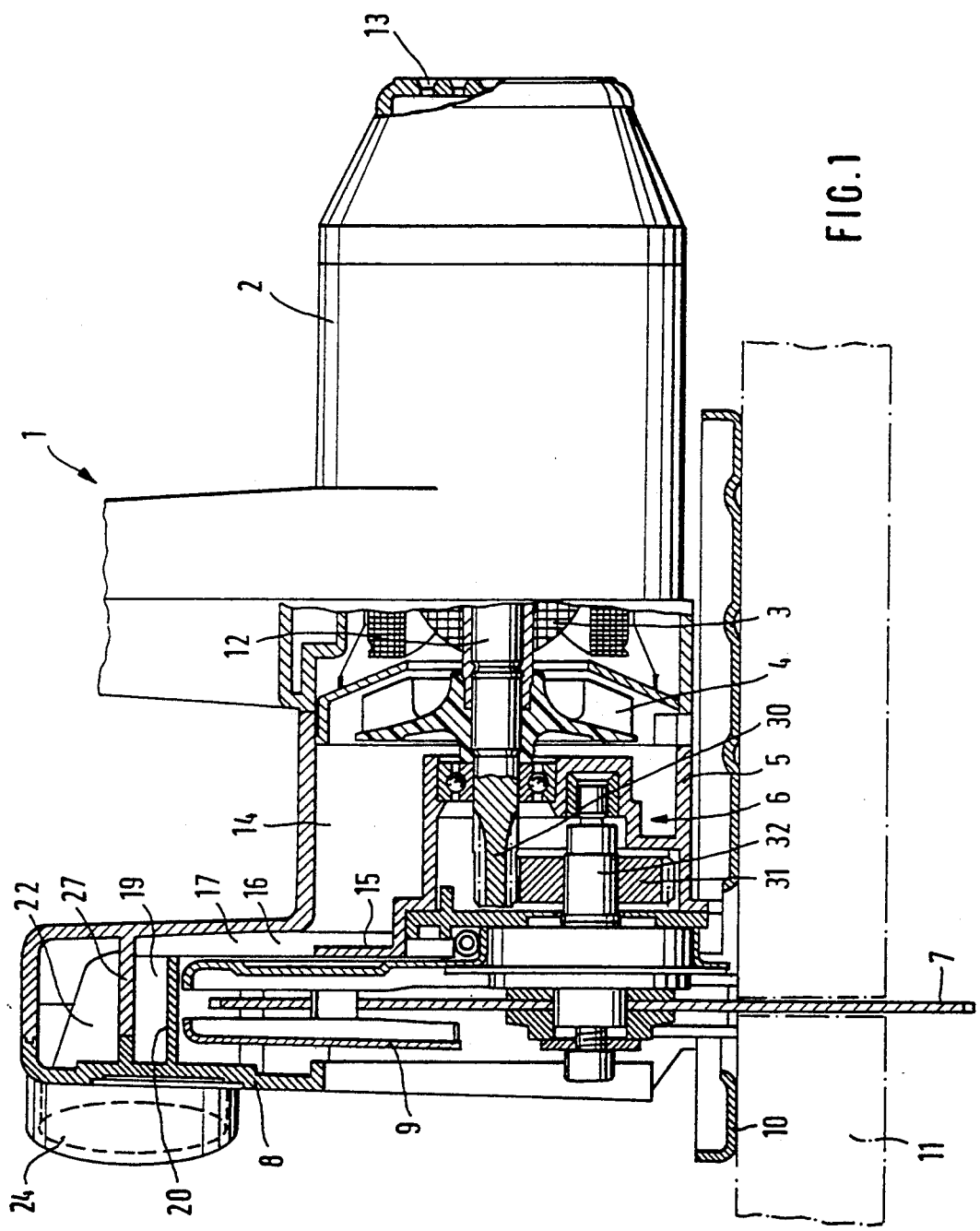
FIG. 1 shows a longitudinal section through a hand-held circular saw according to line I—I in FIG. 2.

The hand-held circular saw 1 has a housing 2 in which a motor 3 with fan wheel 4 is accommodated. A gearing housing 5 adjoins the housing 2 and receives a gear unit 6 and a saw blade 7. The gearing housing 5, which is preferably cast, is covered by a hood 8 and, together with the latter, forms a protective housing for the saw blade. A swinging protective hood 9 enclosing the saw blade is arranged in the housing 5 so as to be rotatable. The circular saw contacts a work piece 11 with its supporting table 10.

Figure 2:
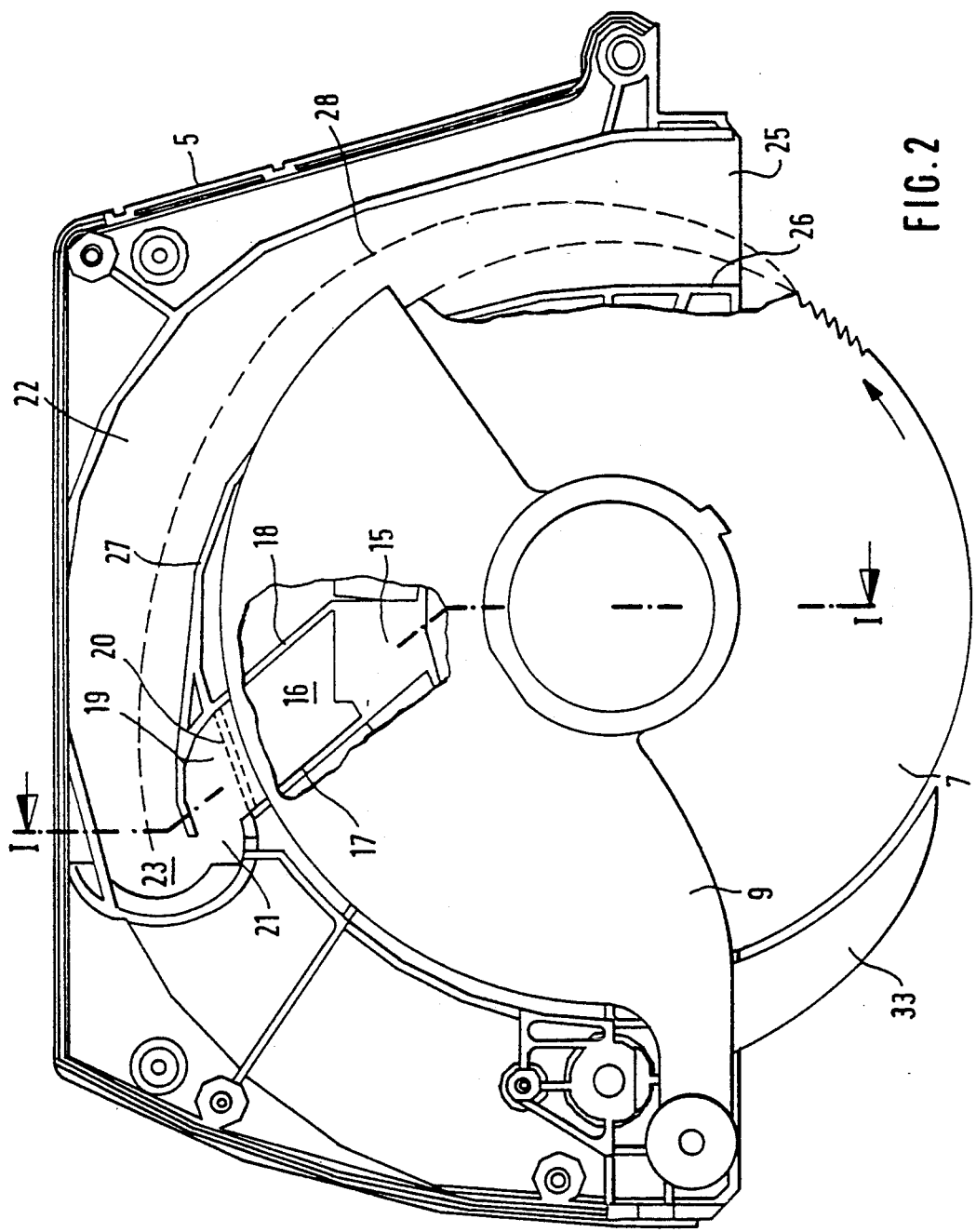
FIG. 2 shows a front view of the gearing housing with the cover hood removed, but with swinging protective hood and inserted saw blade.
Figure 4:
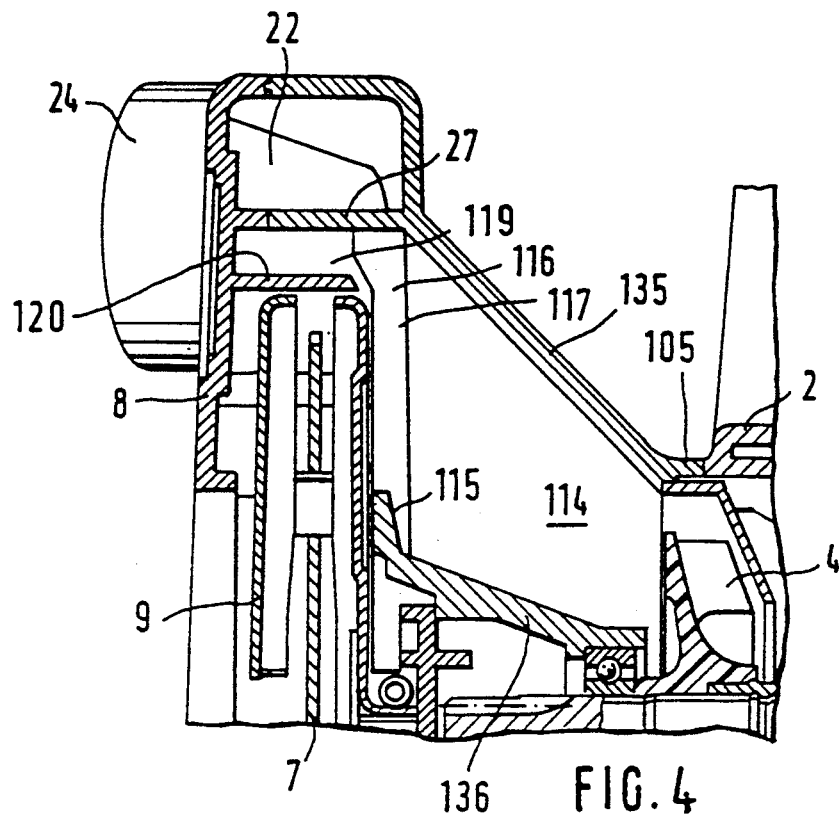
FIG. 4 shows a second embodiment example in longitudinal section.

The fan wheel 4 sits directly on the drive shaft 12 of the motor and sucks air into the housing 2 through slots 13. The air is guided along the motor 3 for the purpose of cooling. The fan exhaust air coming from the cooling means is guided further through a duct 14 in the direction of the saw blade 7. The air is deflected by 90° by a cover wall 15 and guided out radially through the radial duct 16. The radial duct 16 is defined by side walls 17, 18 (see also FIG. 2) and is defined toward the saw blade by a side wall of the swinging protective hood 9. The duct 14 and the radial duct 16 can be produced in a simple two-part coreless form by means of casting, since covered hollow spaces have been avoided. This is achieved in that the cover wall 15 extends only until the outer wall of the housing 5 defining the duct 14. As as seen in the forming out direction of the cast housing 5 which extends parallel to the axis of the motor pinion 30, the cover wall 15 does not intersect with other parts of the housing 5. The swinging protective hood 9 assumes the function of the fourth duct wall in the duct 16. A duct piece 19 which extends along the entire width of the protective housing 5, 8 and is bent in a tangential direction to the saw blade adjoins the duct 16. The duct piece 19 is defined toward the swinging protective hood by an intermediate wall 20 which is arranged at the hood 8. The outlet of the duct piece 19 forms an opening 21 which connects the duct piece 19 with a sawdust duct 22 arranged in the protective housing 5, 8. The outlet gives the fan air approximately the same direction as that in which the air flows in the sawdust duct 22.

The opening 21 is located at a point in the sawdust duct, at which sawdust may possibly deposit and stoppage can occur. Shortly before the opening 21, the sawdust duct 22 extends in a bend 23 and opens into an outlet opening 24 which is directed sideways and is constructed as a connection piece and. A suction hose can be connected to the outlet opening 24 for removal of the sawdust (see also FIG. 3). The sawdust duct 22 runs out of the outlet opening 24 in a spiraling manner so as face inward slightly to its inlet opening 25. The saw blade 7 partially dips into the sawdust duct 22. The inner sawdust duct wall 26 forms a slot in this area which allows the saw blade 7 and, further along, the swinging protective hood 9 to pass through. The inner sawdust duct wall 27 is completely closed in the upper area until the opening 21. The path of the sawdust is indicated by the dashed line 28.

The drive of the saw blade 7 is effected via a pinion 30 which sits on the drive shaft 12 and meshes with a toothed wheel 31. The latter is connected with a shaft 32 on which the saw blade is also fastened. The swinging protective hood 9 is rotatably arranged concentric to the shaft 32, so that it covers the portion of the saw blade 7 projecting out over the supporting table 10 when the saw is not in use. The swinging protective hood is slit in the middle so as not to collide with a gap wedge 33 (see FIG. 1).

The swinging protective hood 9 is turned inward into the protective housing 5, 8 for sawing, as is shown in the drawing. The occurring sawdust is guided into the sawdust duct 22 via the inlet opening 25 when the saw blade is rotated in the direction of the arrow. The momentum of the sawdust and the air flow occurring by means of the rotation of the saw blade 7 are sufficient for carrying the sawdust far into the duct 22. However, the kinetic energy is still not sufficient for conveying the sawdust further to the outlet opening 24, particularly when there is a deflecting point located there for guiding the sawdust sideways away from the machine. If the sawdust remains lying at the bend 23 in the duct 22, there is the risk that the duct will become stopped. Therefore, according to the invention, the fan air is introduced into the sawdust duct from the motor cooling means in the rear area of the sawdust duct parallel to the movement direction of the sawdust material. In the area before the opening 21, as seen in the flow direction, the cooling exhaust air produces a vacuum in the duct 22 which carries away the sawdust particles. In the area following the opening, particularly in the bend 23, the exhaust air produces a strengthened flow which carries the sawdust out of the duct 22.

Figure 3:
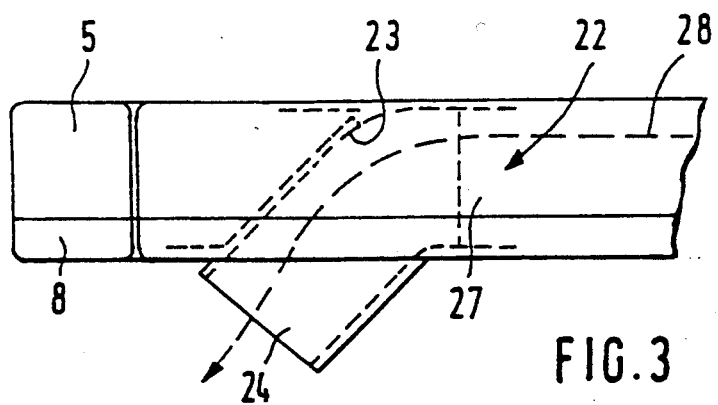
FIG. 3 shows a top view of the protective housing.

The second embodiment example according to FIG. 3 corresponds to the first embodiment, with the exception of the construction of the duct 114, 116. Identical parts therefore have the same reference numbers.

The gearing housing 105 has a wall 135 extending diagonally from the fan wheel 4 directly to the sawdust duct 22 for defining the duct portions 114, 116 which pass into one another. The opposite wall 136 extends diagonally in the same direction. A cover wall 115 arranged approximately parallel to the saw blade adjoins the latter. The intermediate wall 120 is constructed so as to be somewhat shorter relative to the first embodiment example in order to achieve a more uniform flow. The radial wall 117 is constructed so as to be somewhat higher in the area of the duct piece 119. As a result of all these steps, abrupt deflections of the fan air flow which lead to energy losses are avoided and the efficiency of the sawdust suction is accordingly additionally improved. Moreover, the function corresponds to that of the first embodiment example.

The invention is not limited to the embodiment examples shown here. In particular, it is also applicable to saws with other protective housing constructions, e.g. to those without swinging protective hoods or to so-called plunge saws. In these cases, the duct 16 or 116 extends up to the saw blade, e.g. with side walls 17, 18 which are increased in height, so that the saw blade defines the duct. However, a separate intermediate wall can also be provided for defining the fan air duct.

We claim:

1. A hand-held circular saw, comprising a housing; a saw blade; a motor arranged to drive said saw blade; a fan wheel driven by said motor; a protective housing having a gearing housing portion, said protective housing having an inlet and an outlet opening for removal of the sawdust, and also a third opening for supplying fan air produced by said fan wheel; and means forming a duct which is connected with said opening for supplying the fan air, said duct extending in said gearing housing portion and being connected with an exhaust side of said fan wheel.

2. A hand-held circular saw as defined in claim 1; and further comprising a supporting table, said protective housing enclosing said saw blade above said supporting table.

3. A hand-held circular saw as defined in claim 1, wherein said motor has a drive shaft, said fan being arranged on said drive shaft.

4. A hand-held circular saw as defined in claim 2; and further comprising a swinging projective hood which overlaps a portion of said saw blade projecting out over said supporting table, said swinging protective hood being swivelable into said protective housing during sawing and defining a wall of said duct, so as to form a part of said means.

5. A hand-held circular saw as defined in claim 1, wherein said saw blade forms a defining wall of said duct so as to form a part of said means.

6. A hand-held circular saw as defined in claim 1; and further comprising means forming a sawdust duct in said protective housing, said means forming said sawdust duct including walls which extend substantially perpendicularly to said saw blade and face saw blade.

7. A hand-held circular saw as defined in claim 1; and further comprising a cover wall extending approximately parallel to said saw blade so that air coming from said fan wheel is deflected by said cover wall.

8. A hand-held circular saw as defined in claim 7; and further comprising means forming a sawdust duct and an opening for supplying the fan air, said opening for supplying the fan air being located at a point at which kinetic energy of the sawdust can equal zero.

9. A hand-held circular saw as defined in claim 8, wherein said opening for supplying the fan air is located at a deflecting point of a flow of sawdust.

10. A hand-held circular saw as defined in claim 8, wherein said opening for supplying the fan air is located at said point in said protective housing.

11. A hand-held circular saw as defined in claim 8, wherein said opening for supplying the fan air is located at said point in said sawdust duct.

12. A hand-held circular saw as defined in claim 8, wherein said opening for supplying the fan air and said duct are designed so that the fan air flows into said sawdust duct with approximately the same flow direction as the air loaded with sawdust.

13. A hand-held circular saw as defined in claim 8, wherein said duct in a substantially radial direction from said fan wheel to said opening for supplying the fan air is located at a point.

14. A hand-held circular saw as defined in claim 1, wherein said means forming said duct include a cover wall which form one wall of said protective housing and does not intersect other walls of said protective housing so that said duct can be easily produced by casting.

15. A hand-held circular saw as defined in claim 6, wherein said means forming said duct include duct walls which extend diagonally between said fan wheel and said sawdust duct so that said duct is a substantially straight duct without abrupt deflections.

* * * * *